United States Patent [19]
Del Vecchio et al.

[11] Patent Number: 5,444,377
[45] Date of Patent: Aug. 22, 1995

[54] ELECTRONIC TRIP DEVICE COMPRISING A TEST DEVICE

[75] Inventors: Alain Del Vecchio, Echirolles; Marc Ferrazzi, Fontaine, both of France

[73] Assignee: Merlin Gerin, France

[21] Appl. No.: 167,355

[22] Filed: Dec. 15, 1993

[30] Foreign Application Priority Data

Dec. 28, 1992 [FR] France .................. 92 15880

[51] Int. Cl.$^6$ .................................. G01R 31/02
[52] U.S. Cl. ........................... 324/424; 361/87
[58] Field of Search ............... 324/424, 509; 361/42, 361/44, 48, 63, 87, 93

[56] References Cited

U.S. PATENT DOCUMENTS

| | | | |
|---|---|---|---|
| 4,068,275 | 1/1978 | Teel et al. .................. | 361/63 |
| 4,105,965 | 8/1978 | Russell ....................... | 324/424 |
| 4,761,704 | 8/1988 | Fraisse et al. ............... | 324/509 |
| 4,814,712 | 3/1989 | Burton et al. ............... | 324/424 |
| 4,851,950 | 7/1989 | Ballada ....................... | 361/44 |
| 4,977,513 | 12/1990 | La Palme .................... | 324/424 |
| 5,086,367 | 2/1992 | Ishii et al. ................... | 361/87 |

FOREIGN PATENT DOCUMENTS

2592998  7/1987  France .

Primary Examiner—Sandra L. O'Shea
Assistant Examiner—Roger C. Phillips
Attorney, Agent, or Firm—Parkhurst, Wendel & Rossi

[57] ABSTRACT

The terminals of a test circuit are directly connected to outputs of the transformer secondary windings and to the input of the rectifying circuit so that the test current checks operation of the trip device. A sign detection circuit supplies a processing circuit with the values of the polarities of the rectified currents. The processing circuit comprises means for determining the presence of a test current when the sign of the rectified current comprising the test current remains continuously in the same polarity. A differentiation of the continuous polarity, positive or negative, of the test current enables testing to be carried out with or without earth protection tripping.

9 Claims, 8 Drawing Sheets

ELECTRONIC TRIP DEVICE COMPRISING A TEST DEVICE

BACKGROUND OF THE INVENTION

The invention relates to an electronic trip device for a multipole electrical circuit breaker protecting an electrical power system, comprising:
- a current sensor per pole supplying a secondary current representative of a current flowing in an associated conductor of the power system protected by the circuit breaker,
- test current input means,
- a detection and rectifying circuit, to which the secondary currents and test current are applied, supplying signals representative of the currents flowing in the conductors to be protected and of the test current,
- an electronic processing unit receiving the signals supplied by the detection and rectifying circuit and delivering a tripping order, with or without a time delay, when the currents flowing in the conductors to be protected, an earth fault current or a test current exceed preset thresholds.

Test devices for electronic trip devices generally comprise a test socket equipped with terminals to which a test current is applied. This current simulates a fault current which could occur on secondary windings of the current transformers or sensors. According to the connection mode of the test socket terminals, the current is added or combines with the sensor currents in order to test the whole of the trip device. In state-of-the-art trip devices comprising protection functions called thermal or long delay, magnetic or short delay, and earth fault for earth protection, a discriminator enables the earth protection to be tested independently. When the test current is applied in a first direction, positive polarity on a first terminal and negative on a second, the trip device does not take account of this test current for earth protection and trips on long delay or short delay. If the current direction is inverted the trip device uses the test current to determine a value representative of the earth fault current and tripping is brought about by the earth protection. The means for determining the value representative of the earth fault current and the means for discriminating the test-current are, in state-of-the-art manner, integrated into the detection and rectifying circuit, as in French Patent FR-2,592,998, corresponding to the Patent EP-235,479.

In highly integrated electronic trip devices, the means for determining the value representative of the earth fault current are included in the processing unit, so as to reduce the cost and volume of the components. For the same reasons state-of-the-art type test current discrimination means can no longer be advantageously incorporated in the rectifying circuit.

SUMMARY OF THE INVENTION

The object of the invention is to achieve an electronic trip device comprising a test device, with a simplified detection and rectifying circuit, and integrating means for detecting the presence of a test current and means for differentiating earth protection testing in the processing unit.

According to the invention, the electronic processing unit comprises means for detecting a DC test current having a period greater than that of the electrical power system to be protected.

According to one embodiment of the invention, the means for applying the test current are connected to the detection and rectifying circuit so as to supply an output of the detection and rectifying circuit at least one summed signal representative of the sum of the test current and of the current supplied by one of said sensors or by an earth fault sensor.

According to a development of the embodiment, the processing unit comprises means for determining the sign of the summed signal or of the test current.

In a preferred embodiment, the processing unit comprises means for determining the time during which said sign keeps a preset value, and means for comparing this time with a preset duration.

According to a development of the invention, the processing unit comprises means for performing an earth protection function and means for inhibiting said earth protection function.

According to a particular embodiment, the means for applying the test current comprise a first terminal, connected to an output of a secondary winding of a first current sensor and to a first input of the detection and rectifying circuit, and a second terminal, connected to an output of a secondary winding of a second current sensor and to a second input of the detection and rectifying circuit.

According to another embodiment of the invention, the processing unit comprises correction means connected between the detection and rectifying circuit, and circuits for performing tripping functions, said correction means being connected to an output of the test current detection means supplying a signal representative of the presence of a test current.

BRIEF DESCRIPTION OF THE DRAWINGS

Other advantages and features will become more clearly apparent from the following description of illustrative embodiments of the invention, given as non-restrictive examples only and represented in the accompanying drawings in which.

DETAILED DESCRIPTION OF THE PREFERRED EMBODIMENT

Figure 1:
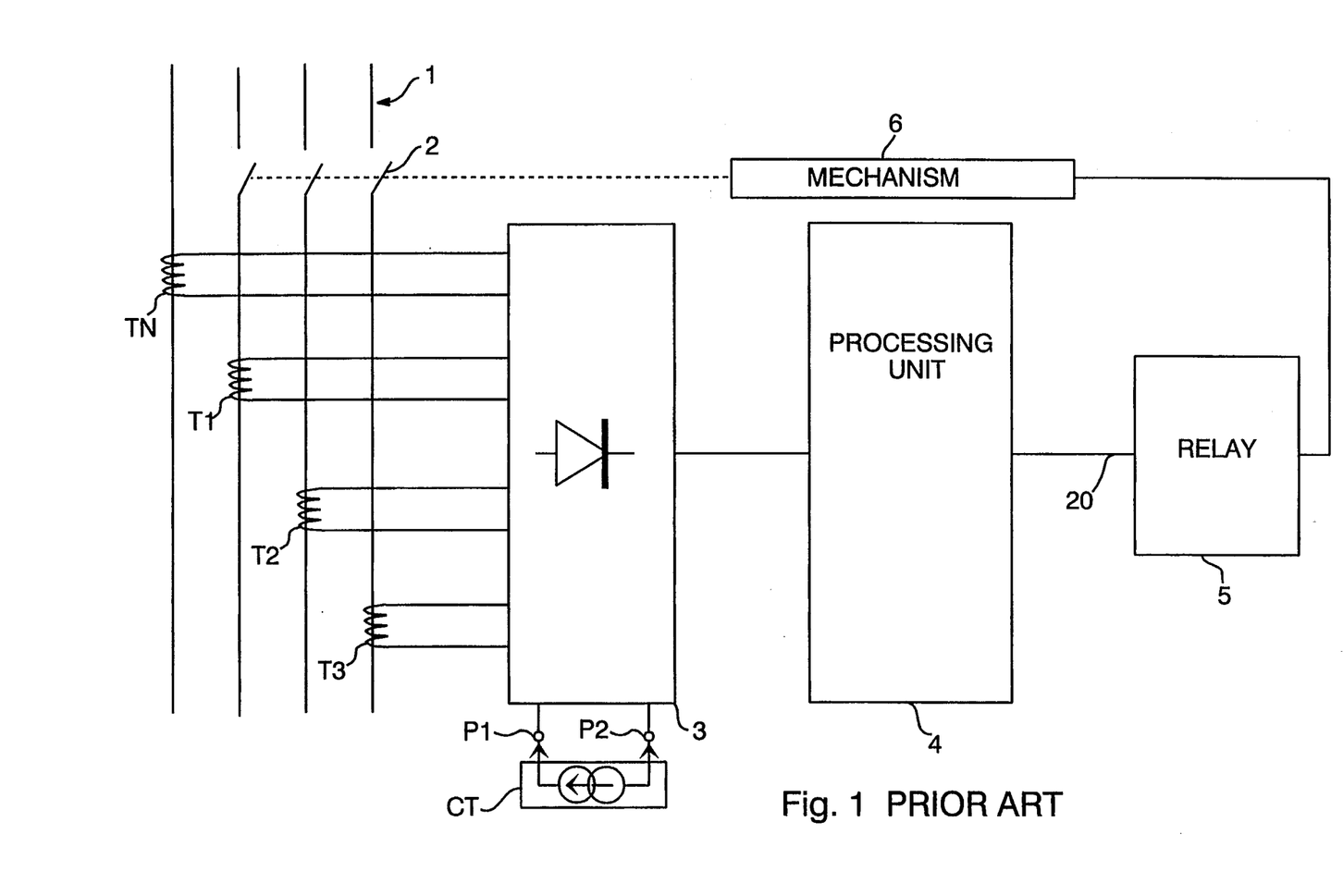
FIG. 1 represents a simplified block diagram of a circuit breaker in which a trip device comprising the invention can be implemented.

FIG. 1 represents a state-of-the-art circuit breaker. An electrical power system 1 to be protected is composed of electrical conductors, generally corresponding to the three phases and neutral of a system. Contacts 2 enable the current to be established or interrupted in the phase conductors. In the figure as in a great many systems, the neutral conductor is distributed without being broken. Current transformers T1, T2, T3 and TN associated with the different conductors of the power system transform the primary currents of high value into secondary currents compatible with electronic trip devices. A test circuit with auxiliary terminals P1 and P2 enables a test current to be received from a test generator GT to check operation of the trip device. The secondary currents and test current are applied to the input of a phase, neutral and earth fault current rectifying and detection circuit 3. This circuit supplies signals representative of these currents to an electronic processing unit 4. A tripping order 20 produced by the processing unit 4 is applied to the input of a control relay 5 which actuates an opening mechanism 6 of the circuit breaker contacts 2.

In the electronic trip device represented, the value of the earth fault current is determined in the processing unit and the rectifying and detection circuit 3 does not comprise a component discriminating between the earth protection test and the long delay or short delay test, in terms of the direction of the test current supplied by the generator.

Figure 2:
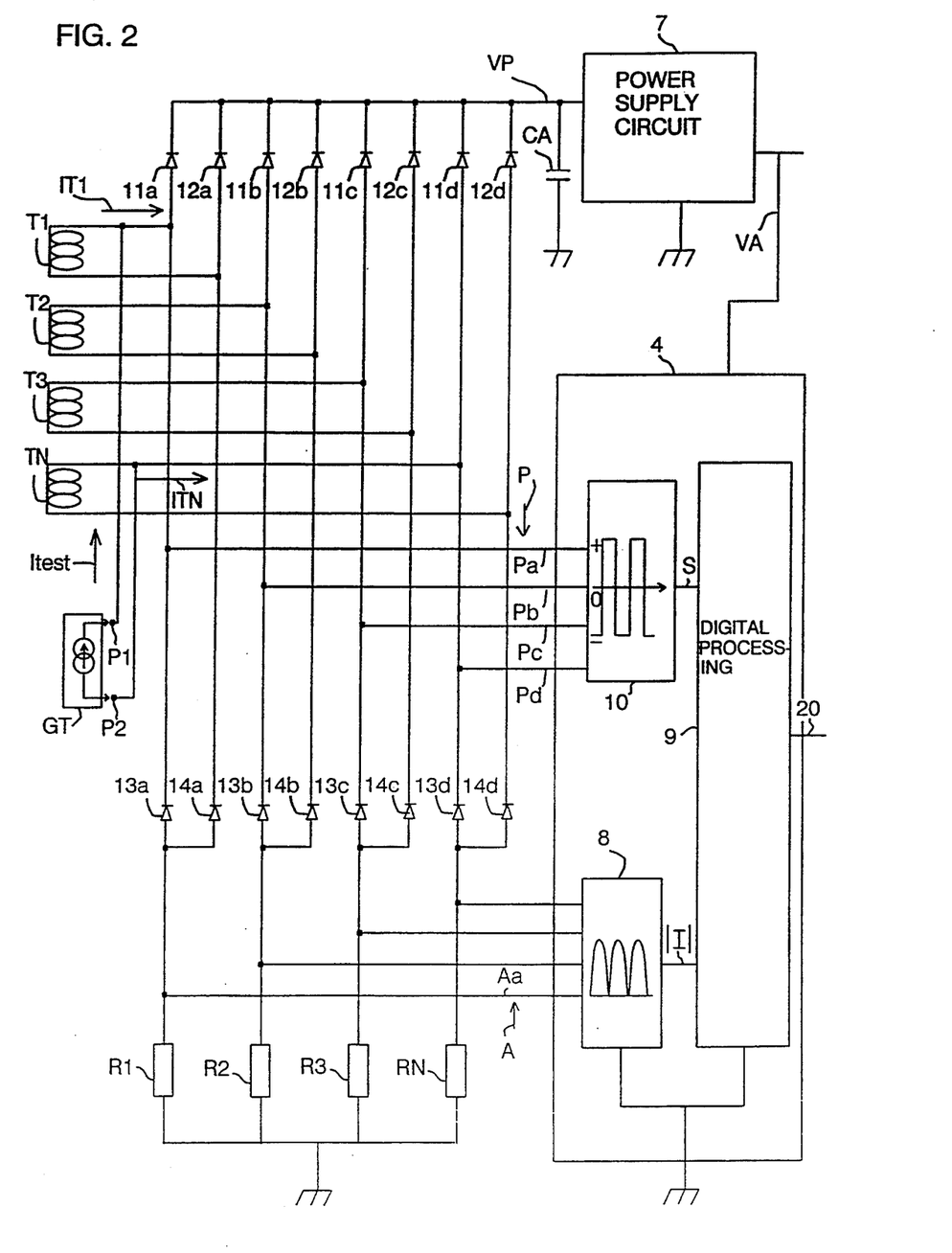
FIG. 2 represents a diagram of a trip device according to an embodiment of the invention.

The diagram of a trip device according to an embodiment of the invention is represented in FIG. 2. Each secondary winding of the current transformers is connected to a rectifier bridge represented by a group of four diodes. For each current transformer T1, T2, T3, TN, a first end Pa, Pb, Pc, Pd of the secondary winding is connected to the anode of a first associated diode 11a, b, c, d and to the cathode of a second associated diode 13a, b, c, d, whereas a second end of the secondary winding of T1, T2, T3 or TN is connected to the anode of a third diode 12a, b, c, d and to the cathode of a fourth associated diode 14a, b, c, d. The cathodes of the first and third diodes (11a, b, c, d; 12a, b, c, d) are connected to a positive power supply line Vp. The anodes of the second and fourth diodes associated with a secondary winding (13a, 14a; 13b, 14b; 13c, 14c; 13d, 14d) are connected to a first terminal of an associated measuring resistance (R1, R2, R3, RN), the other terminal of each of the measuring resistances being connected to an electrical reference ground of the trip device. The positive power supply line Vp charges a capacitor CA and supplies an input voltage to a power supply circuit 7. The circuit supplies a regulated voltage VA for supply of the trip device. The first terminals of the resistances R1, R2, R3, RN are connected by conductors A to the inputs of an amplitude processing circuit 8. The output of the circuit 8 supplies a digital processing circuit 9 with rectified signals |I| representative of the absolute values of the currents of the power system to be protected.

The first end of each current transformer T1, T2, T3, TN is connected by a conductor Pa, Pb, PC, PD to the input of a current sign detection circuit 10. This circuit 10 supplies on an output S, for each input, a first value if the current sign is positive and a second value if the current sign is negative. The output S of the circuit is connected to the digital processing circuit 9.

In this embodiment the test circuit comprises two auxiliary terminals P1 and P2. The first terminal P1 is connected to the first end of the transformer T1 also corresponding to the cathode of the diode 13a, to the anode of the diode 11a and to an input Pa of the sign detection circuit 10. Likewise, the second terminal P2 is connected to the first end of the transformer TN, to the cathode of the diode 13d, to the anode of the diode 11d and to another input Pd of the sign detection circuit. With this type of connection a test current generated between terminal P2 and terminal P1 is added to the secondary current of the transformer T1 and is subtracted from the current of the transformer TN.

When a current IT1 of positive polarity is flowing in the secondary winding of the transformer T1, it flows via the diode 11a to charge the capacitor CA and supply the trip device via the circuit 7. The current return is via ground and the measuring resistance R1, then via the diode 14a and the second end of the transformer secondary winding. The presence of positive current increases the voltage of the conductor Pa to a value greater than 0 V. The sign detection circuit detects this voltage and supplies on its output a first value representative of the positive polarity of IT1. The voltage measured at the terminals of the resistance R1, between a conductor Aa and ground, has a negative voltage. If the current IT1 is of negative polarity, the second end of the transformer secondary winding has a positive voltage. The current flows via the diode 12a to charge CA and supply the trip device, the return flow being via the measuring resistance R1 and diode 13a. The measuring voltage R1 between Aa and ground is always negative whereas the voltage at Pa becomes negative and the sign detection circuit supplies on output a second value, representative of the negative polarity of IT1. The currents flowing in the other secondary windings of the current transformers (TN, T2, T3) and directed by the associated rectifying diodes produce the same effects on the sign detection circuit 10 and the inputs of the amplitude processing circuit 8.

The assembly, comprising the current transformer T1, diodes 11a, 12a, 13a and 14a, resistance R1, connections Pa and Aa, and the parts of the circuits 8, 9, 10 corresponding to the current IT1, form a channel for measuring the current of a first phase.

FIG. 3 shows a representation of the currents and signs when a test is performed. The current IT1 is the sum of the current of the secondary winding of the transformer T1 and of the test current. ITN represents the current of the secondary winding of the transformer TN from which the test current is subtracted.

Figure 3A:
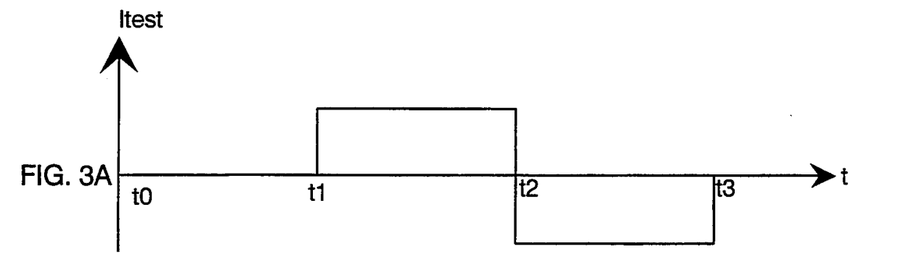
FIGS. 3 and 4 show current signals when a trip device is tested in operation and out of operation.
Figure 3B:
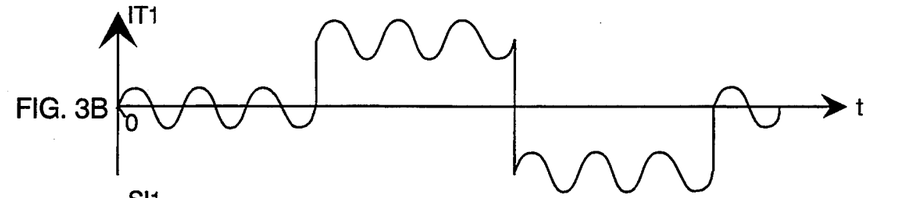
Figure 3C:
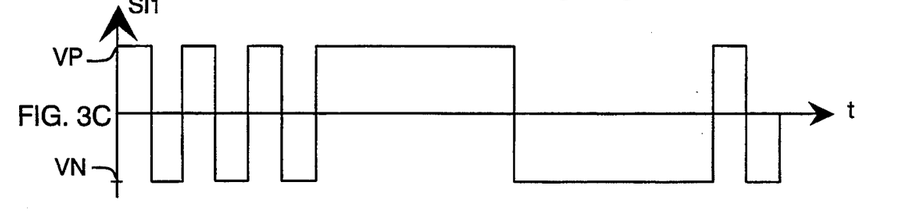
Figures 3D, 3E:
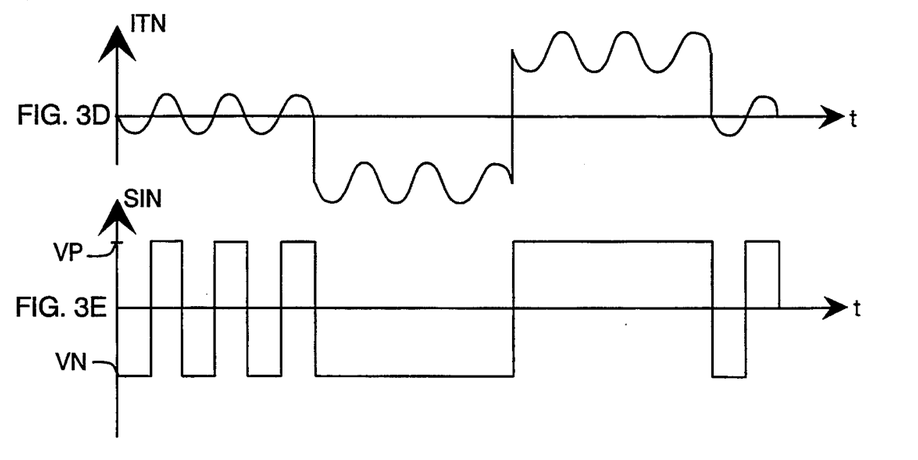
Figures 4A, 4B:
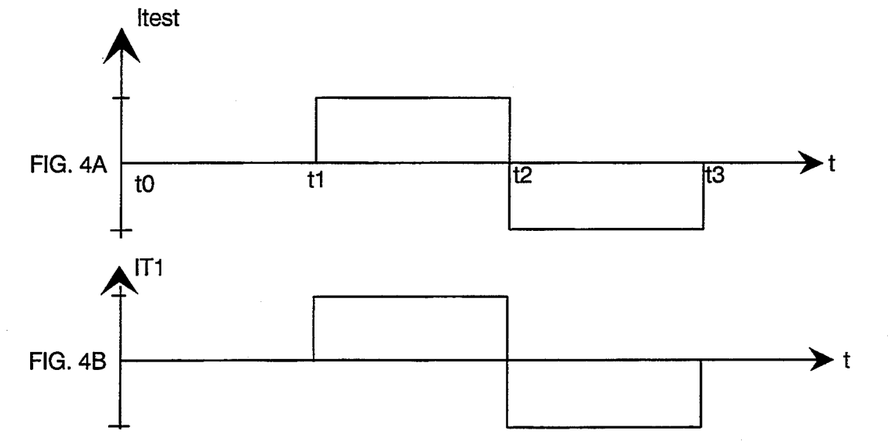
Figure 4C:
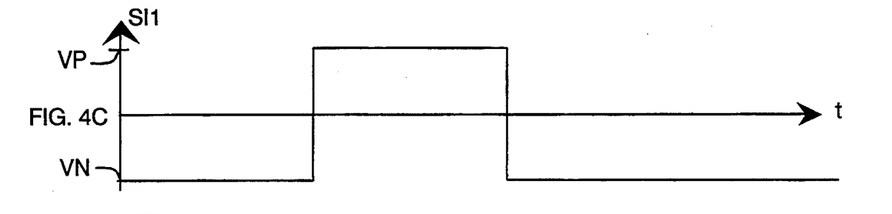
Figure 4D:
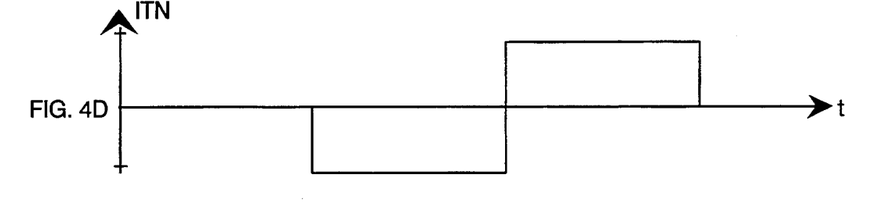
Figure 4E:
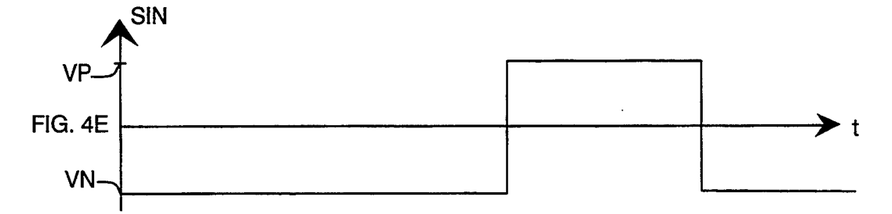

Indicators SI1 and SIN represent the signs respectively of IT1 and ITN. They can for example take a positive value VP if the current is positive and a negative value VN if the current is negative or zero. The test current represented in FIG. 3a is zero between the times t0 and t1, positive, flowing in the direction P2 to P1 in the test signal generator GT between the times t1 and t2, and negative, flowing in the direction P1 to P2 in the generator between the times t2 and t3. The alternating currents IT1 and ITn are respectively represented in FIGS. 3b and 3d. They supply between t0 and t1 sign signals respectively SI1 and SIN (FIGS. 3c and 3e) whose values change at each half-wave. When a positive test current Itest, of a value greater than the amplitude of the secondary winding currents, is applied between the times t1 and t2, IT1 remains of positive polarity and ITN of negative polarity in continuous manner, and the sign signals SI1 and SIN keep fixed values respectively VP and VN. If the test current is inverted between the times t2 and t3, IT1 is of negative polarity and SI1 is equal to VN and ITN is of positive polarity, and SIN is equal to VP.

The same type of test can be carried out on a circuit breaker not in operation. In FIG. 4, the currents of the secondary windings of the transformers T1, 2, 3, N are zero, IT1 (FIG. 4b) is equal to the test current and ITN (FIG. 4d) corresponds to the inverted test current. The sign signals SI1 (FIG. 4c) and SIN (FIG. 4e) respectively represent the polarity of IT1, i.e. Itest, and ITN, i.e. inverted Itest.

According to this embodiment, detection of the presence of a test current can be performed by means enabling the permanence of a sign on one of the inputs of the processing circuit corresponding to one of the measuring channels receiving the test current to be determined. The value of this permanent sign signal makes it possible to differentiate-the test by enabling earth protection testing for a first value of the sign signal, and disabling it for a second value corresponding to a different sign. Although two sign signals SIN and SI1 are available, only one is in practice used to implement the invention. In the description which follows, the sign SIN will be used for the purposes of test detection.

Figure 5:
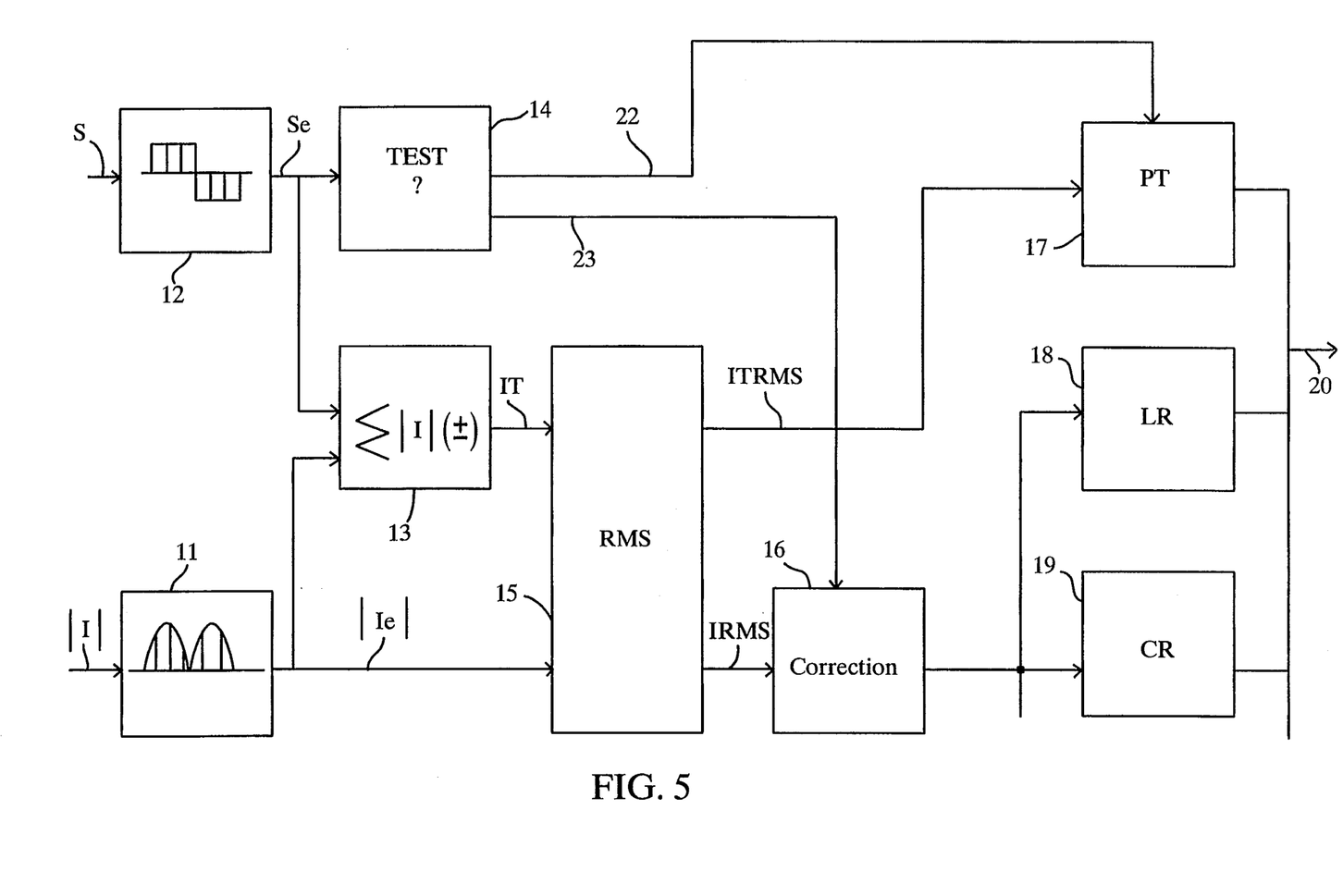
FIG. 5 represents the architecture of a particular embodiment of the circuit of a trip device according to FIG. 2.

The architecture of an embodiment of the processing circuit 9 is represented in FIG. 5. Sampling circuits 11 and 12 respectively sample the signals representative of the rectified currents |I| and the signals representative of the signs S of said currents. The samples of the current values Ie and signs Se are applied to the input of a circuit 13 for determining the value of the earth fault current IT.

In this embodiment the circuit 13 computes the value of the current IT by performing the vector sum of the values of the currents flowing in the conductors to be protected. The values of the samples |Ie| whose corresponding sign Se is of positive value are added, and the values of the samples whose corresponding sign Se is of negative value are subtracted. The current value samples |Ie| and the value of the earth protection current can be applied to the inputs of a circuit 15 for computing the rms values, respectively IRMS and ITRMS. The values of the rms currents IRMS representing the current transformer currents can be corrected by a correction circuit 16 before being applied to circuits 18, 19 respectively performing long delay LR and short delay CR tripping functions. The value of the earth protection current IT or ITRMS is applied to a circuit 17 performing an earth protection function PT. The circuits performing the LR, CR, PT protection functions supply, in state-of-the-art manner, a tripping signal 20 when preset current and time delay thresholds are exceeded.

According to this embodiment, the sign signals Se or S are applied to a circuit 14 for determining test current presence.

The circuit 14 detects the presence of a test current when a sign signal, for example SIN, has a constant value for a time t(SIN) greater than a preset time tmin, itself greater than the period of the electrical power system to be protected. When the circuit 14 has detected the presence of a test signal, it determines the sign of the test current so as to determine whether the test involves the earth protection function or the other tripping functions. If the test current presence information indicates that the sign of SIN has a value Vp for a time greater than tmin, it is the other tripping functions that are being tested. The circuit 14 then supplies an inhibition signal 22 to the circuit 17 performing the earth protection function PT. In this way, the current signals applied to the circuits 17, 18, 19 will only be taken into account by the tripping circuits other than the circuit 17.

In the case where an earth protection function test is involved, it is not indispensable to inhibit the other functions as the earth protection function threshold and time delay are generally lower than those of the other functions. When the presence of a test current is detected by the circuit 14, a signal 23 can be applied by the circuit 14 to the correction circuit 16, so as to enable the tripping threshold and time correction parameters to be modified.

Figure 6:
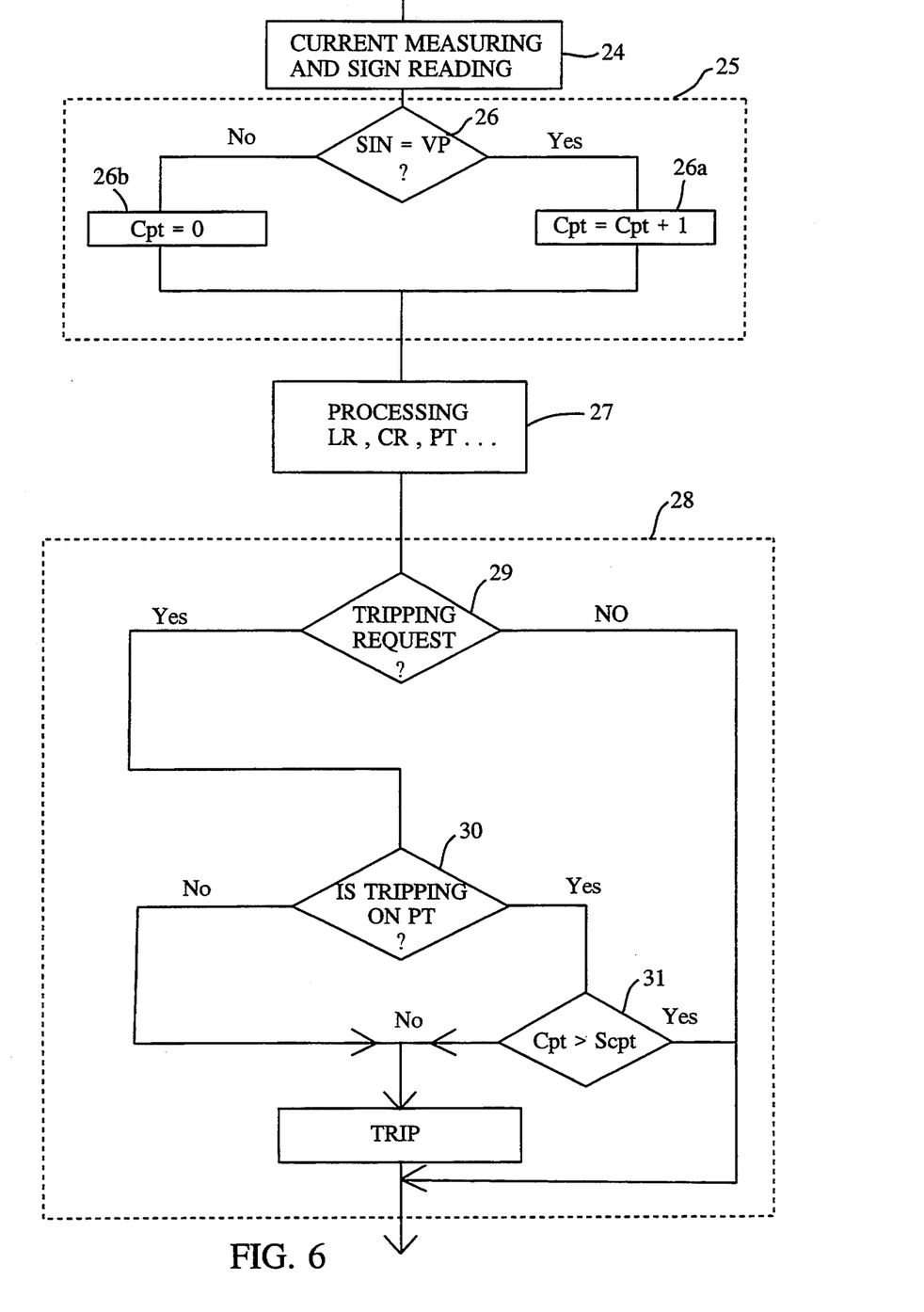
FIG. 6 represents the flow chart of a processing according to an embodiment of the invention.
Figure 7A:
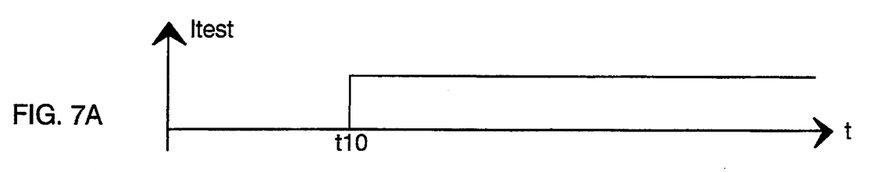
FIGS. 7 and 8 illustrate the values of the signals when a differentiated test of the long delay and earth protection is performed.
Figure 7B:
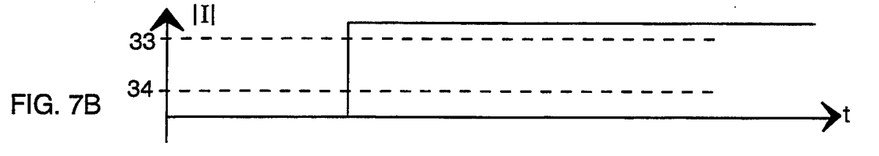
Figure 7C:
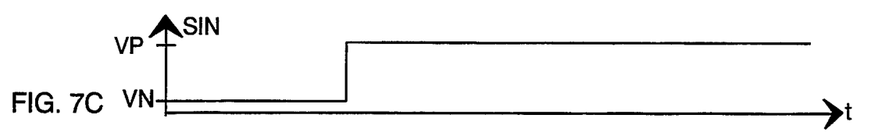
Figure 7D:
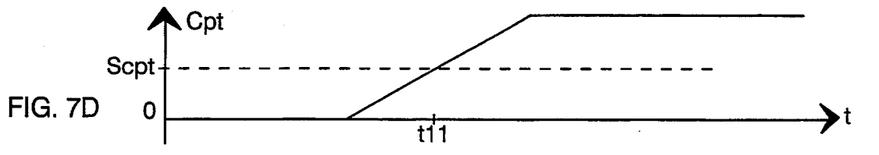
Figure 7E:
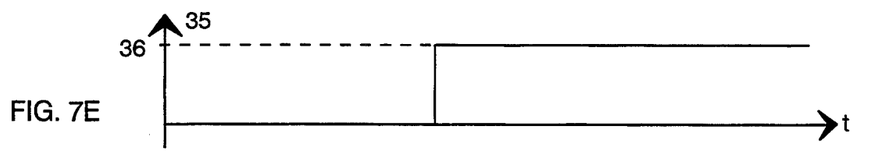
Figure 7F:
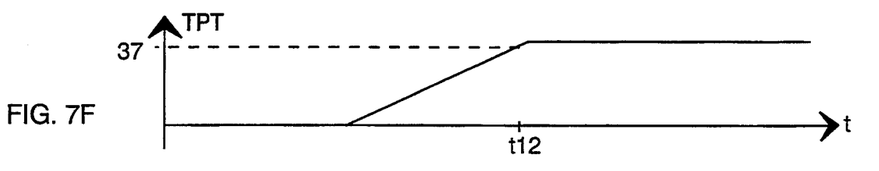
Figure 7G:
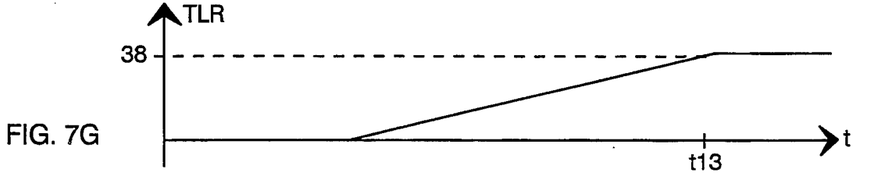
Figure 7H:
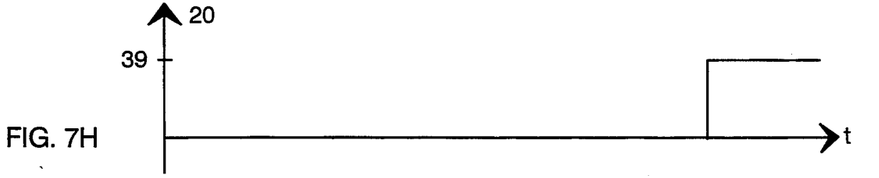

The processing circuit 9 can comprise a microprocessor programmed in such a way as to perform the functions of the circuit represented in FIG. 5. An example of a flow chart is illustrated in FIG. 6. In a stage 24, measurement of the currents and reading of the signs is performed for processing of the tripping functions. Detection of the permanence of a sign and differentiation of the type of test are performed in a module 25. A comparison stage 26 detects whether the value of the sign SIN is equal to the value VP. If this equality is true, a counter Cpt is incremented (Cpt=Cpt+1), in a stage 26a, if not this counter is zero reset in a stage 26b. Processing of the LR, CR, PT tripping functions is performed in a stage 27 and checking inhibition of the earth protection tripping function is performed by a module 28. This module comprises a tripping request detection stage 29, a tripping request differentiation stage 30, an inhibition checking stage 31 and a stage 32 producing a tripping order. When at stage 29 a tripping request is detected, stage 30 differentiates this request. If the request does not correspond to an earth fault trip, a tripping order is directly produced by stage 32. In the case of an earth protection tripping request, stage 31 checks inhibition by comparing the value of the counter Cpt with a preset threshold value Scpt. A value of Cpt greater than Scpt corresponds to permanence of the value of the sign signal SIN at the value Vp and to the presence of a test current with inhibition of the earth protection which avoids the tripping stage 32. A value of Cpt lower than Scpt is representative of operation without test current or with an earth protection function test current.

FIGS. 7 and 8 illustrate the different signals as a function of time. At a time t10 (FIG. 7a), a positive current Itest is applied to the test terminals. The absolute value of this current |I| (FIG. 7b) is greater than preset long delay or short delay tripping thresholds 33 and than a preset earth protection function tripping threshold 34. The value of the neutral channel sign SIN is blocked at a value VP (FIG. 7c) and the value of the counter Cpt (FIG. 7d) starts to increase. At the time t11, the counter threshold Scpt is exceeded and an inhibition signal 35 takes a value 36 (FIG. 7e). When the test current was applied at time t10, the protection functions started their time delays. A signal TPT representative of the earth fault protection time delay or temperature rise (FIG. 7f) exceeds a tripping request threshold 37 at a time t12 subsequent to t11. However tripping will not take place, as the value 36 of the inhibition signal 35 disables the effects of the earth protection tripping request. A signal TLR representative of the long delay function time delay or temperature rise (FIG. 7g) reaches a tripping request threshold 38 at a time t13. The tripping signal 20 (FIG. 7h) takes the tripping validation value 39 and orders opening of the circuit breaker.

Figure 8A:
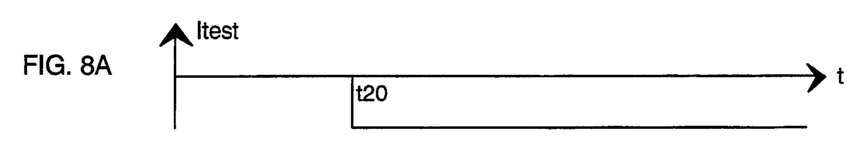
Figure 8B:
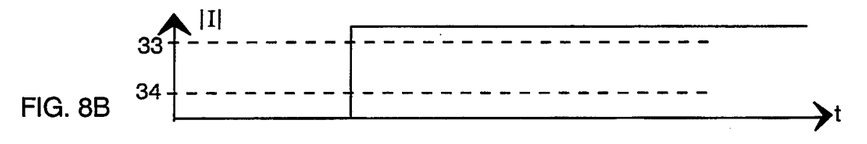
Figure 8C:
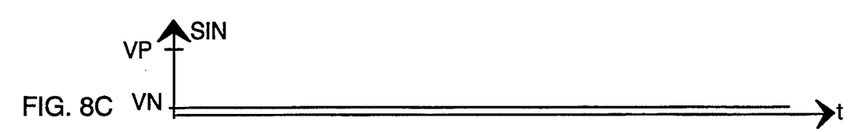
Figure 8D:
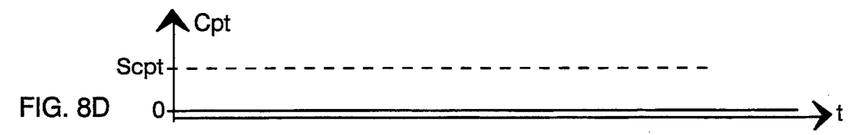
Figure 8E:
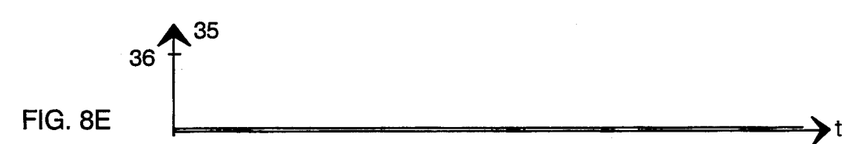
Figure 8F:
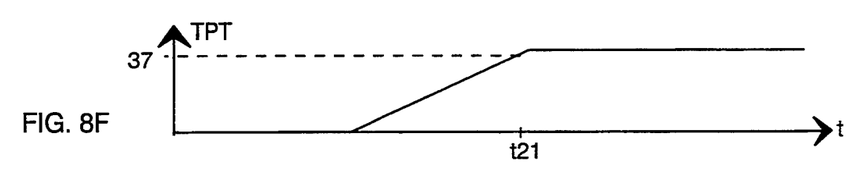
Figure 8G:
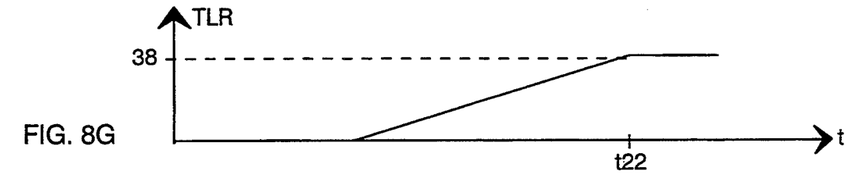
Figure 8H:
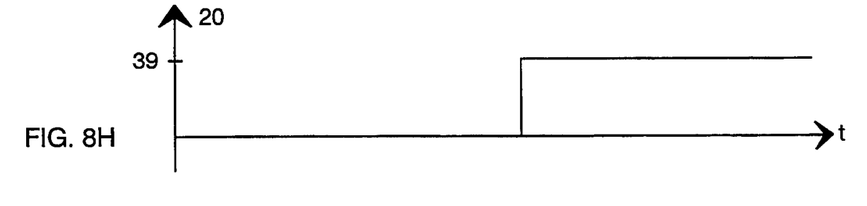

If a negative test current is applied at the time t20 (FIG. 8a), the absolute value |I| of this current is greater than the tripping thresholds 33 for long delay and short delay and 34 for earth protection (FIG. 8b). The value of the sign SIN is blocked at a value VN (FIG. 8c) and the counter value remains at a value lower than the threshold Scpt (FIG. 8d). The inhibition signal 35 is not activated (FIG. 8e). The earth protection time delay signal TPT (FIG. 8f) increases then exceeds the tripping request threshold 37 at the time t21. As the inhibition signal 35 is not active, tripping is possible and the signal 20 takes the value 39 to order opening of the circuit breaker (FIG. 8h). The long delay function time delay signal TLR (FIG. 8g) reaches the tripping request threshold 38 at the time t22 after the earth protection function tripping time t21.

In the embodiment in FIG. 6, detection of the presence of a test current is performed by a counter Cpt which is incremented or zero reset. To reduce sensitivity to certain disturbances, the variations can be performed by a slow increase and a fast decrease of the counter value.

In the embodiment described above, detection of the permanence and value of the sign is performed on the neutral current measuring channel, but any other channel could be used. The test terminals P1 and P2 are respectively connected to two first ends of two sensors respectively T1 and TN, however the test generator can be connected to other ends and other sensors. In other embodiments the test terminals P1 and P2 can be connected directly to additional components of the rectifying circuit and comprise rectifiers specific to the test channel. The test current is then applied directly to the circuits 8 and 10. The invention can be applied to other types of circuit breakers, notably those which comprise current transformers or sensors, for the neutral or earth protection, outside the circuit breaker case. If an external sensor is on the neutral line, the secondary winding is connected to the internal detection and rectifying circuit 3 and operation is identical to that described above. In the case where an external earth fault current sensor has its secondary connected to the detection and rectifying circuit, the invention applies in the same way. The test current is then added to the earth fault current transformer current and means will make it possible to detect the presence of a test current and to differentiate according to the direction of the current whether the test is intended for the earth protection function. The value of the earth fault current is read directly on the earth channel via the detection and rectifying circuit and is not determined according to the absolute values of the phase currents and their signs. However, as in the previous embodiments, a sign signal will serve the purpose of test current detection.

I claim:

1. An electronic trip device for a multipole electrical circuit breaker protecting an electrical power system comprising:
   a current sensor per pole supplying a secondary current representative of a current flowing in an associated conductor of the power system protected by the circuit breaker,
   test current input means,
   a detection and rectifying circuit, to which the secondary currents and test current are applied, supplying signals representative of the currents flowing in the conductors to be protected and of the test current,
   an electronic processing unit receiving the signals supplied by the detection and rectifying circuit and delivering a tripping order when at least one of the currents flowing in the conductors to be protected, an earth fault current and a test current exceed preset thresholds, and
   an electronic trip device wherein the electronic processing unit comprises means for detecting a test current of a period greater than that of the electrical power system to be protected.

2. The trip device according to claim 1, wherein the means for applying the test current are connected to the detection and rectifying circuit so as to supply on output of the detection and rectifying circuit at least one summed signal representative of the sum of the test current and of the current supplied by one of said sensors or by an earth fault sensor.

3. The trip device according to claim 1, wherein the processing unit comprises means for determining at least one of the sign of the summed signal and of the test current.

4. The trip device according to claim 3, wherein the processing unit comprises means for determining the time during which said sign keeps a preset value, and means for comparing this time with a preset duration.

5. The trip device according to claim 4, wherein the processing unit comprises means for performing an earth protection function and means for inhibiting said earth protection function.

6. The trip device according to claim 1, wherein the means for applying the test current comprise a first terminal, connected to an output of a secondary winding of a first current sensor and to a first input of the detection and rectifying circuit, and a second terminal, connected to an output of a secondary winding of a second current sensor and to a second input of the detection and rectifying circuit.

7. The trip device according to claim 1, wherein the detection and rectifying circuit comprises a group of diodes associated with each current sensor, connected as a rectifier bridge, a first and a second diode connected by their cathodes to a positive power supply point, a third and a fourth diode connected by their anodes to a measuring resistance, the first and third diodes being connected in series and their common point being connected to a first output of the associated current sensor, the second and fourth diodes being connected in series and their common point being connected to a second output of the associated current sensor, one of the two outputs of the current sensor being connected to means for detecting the sign of the current flowing in said sensor, said detecting means supplying on output a first value if the current sign is positive or a second value if the current sign is negative, the common point between the third diode, the fourth diode and the measuring resistance supplying a signal representative of the absolute value of the current.

8. The trip device according to claim 1, wherein the processing unit comprises correction means connected between the detection and rectifying circuit, and circuits for performing tripping functions, said correction means being connected to an output of the test current detection means supplying a signal representative of the presence of a test current.

9. The trip device according to claim 1, wherein the test current is a DC current.

* * * * *